United States Patent
Bullmer et al.

(10) Patent No.: US 10,851,953 B2
(45) Date of Patent: Dec. 1, 2020

(54) MODULAR LIGHTING INSTALLATION PLATFORM

(71) Applicant: SIGNIFY HOLDING B.V., Eindhoven (NL)

(72) Inventors: Mathias Bullmer, Atlanta, GA (US); Travis Johnson, Fayetteville, GA (US); James Richard Christ, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/719,551

(22) Filed: Dec. 18, 2019

(65) Prior Publication Data

US 2020/0200335 A1    Jun. 25, 2020

Related U.S. Application Data

(60) Provisional application No. 62/782,218, filed on Dec. 19, 2018.

(51) Int. Cl.
| | | |
|---|---|---|
| *F21S 2/00* | (2016.01) | |
| *H02G 3/08* | (2006.01) | |
| *H02G 3/14* | (2006.01) | |
| *H02G 3/16* | (2006.01) | |
| *H02G 3/18* | (2006.01) | |
| *F21W 121/00* | (2006.01) | |

(52) U.S. Cl.
CPC .............. *F21S 2/005* (2013.01); *H02G 3/085* (2013.01); *H02G 3/088* (2013.01); *H02G 3/14* (2013.01); *H02G 3/16* (2013.01); *H02G 3/18* (2013.01); *F21W 2121/004* (2013.01)

(58) Field of Classification Search
None
See application file for complete search history.

(56) References Cited

U.S. PATENT DOCUMENTS

| | | | |
|---|---|---|---|
| 8,616,720 B2 | 12/2013 | Carney et al. | |
| 9,059,776 B1* | 6/2015 | Jimenez de Parga | ... H04B 3/30 |
| 9,647,459 B2 | 5/2017 | Andrews et al. | |
| 2011/0304273 A1* | 12/2011 | Bennette | .............. H05B 47/105 |
| | | | 315/159 |
| 2018/0301908 A1* | 10/2018 | John | ......................... H02J 4/00 |

* cited by examiner

*Primary Examiner* — Jany Richardson (57) ABSTRACT

A modular lighting installation platform includes a home base unit that is configured to be used as a junction box. The home base unit includes a housing that defines a cavity. The cavity houses circuitry that configured to convert a high voltage AC input power to a low voltage DC output power. The home base unit also includes an output port that is configured to removably couple at least one of a light fixture and an accessory to the home base unit via a low voltage cable to provide the low voltage DC output power to the at least one of a light fixture and an accessory.

20 Claims, 10 Drawing Sheets

MODULAR LIGHTING INSTALLATION PLATFORM

RELATED APPLICATIONS

The present application claims priority to U.S. Provisional Patent Application No. 62/782,218 filed Dec. 19, 2018 and titled "Modular Lighting Installation Platform." The entire contents of the foregoing application are hereby incorporated herein by reference.

TECHNICAL FIELD

Embodiments of the present disclosure relate generally to lighting systems, and more particularly to a modular lighting installation platform.

BACKGROUND

Figure 1:
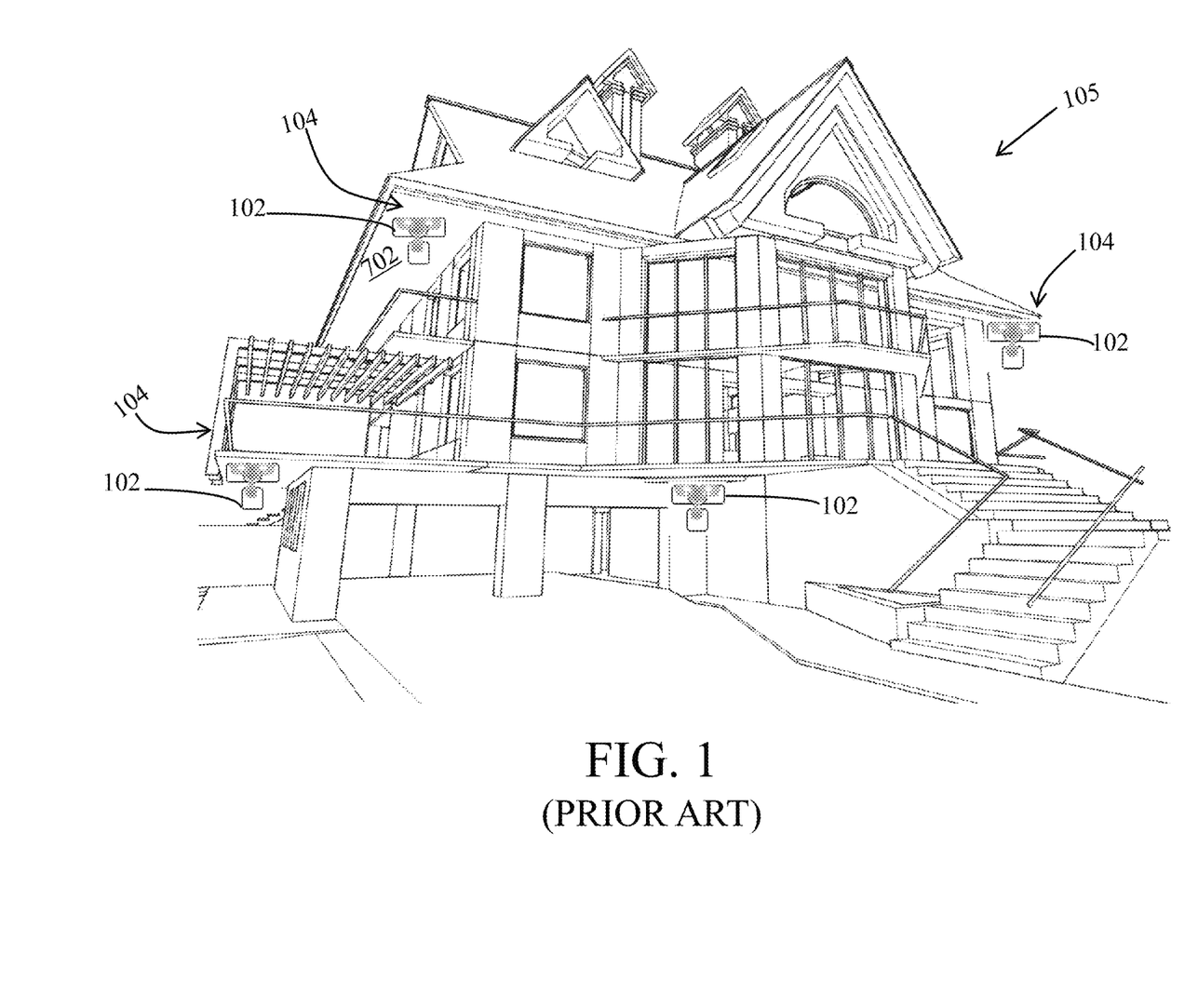
FIG. 1 illustrates a conventional lighting system installed in an example building, in accordance with a prior art lighting system.
Figure 2:
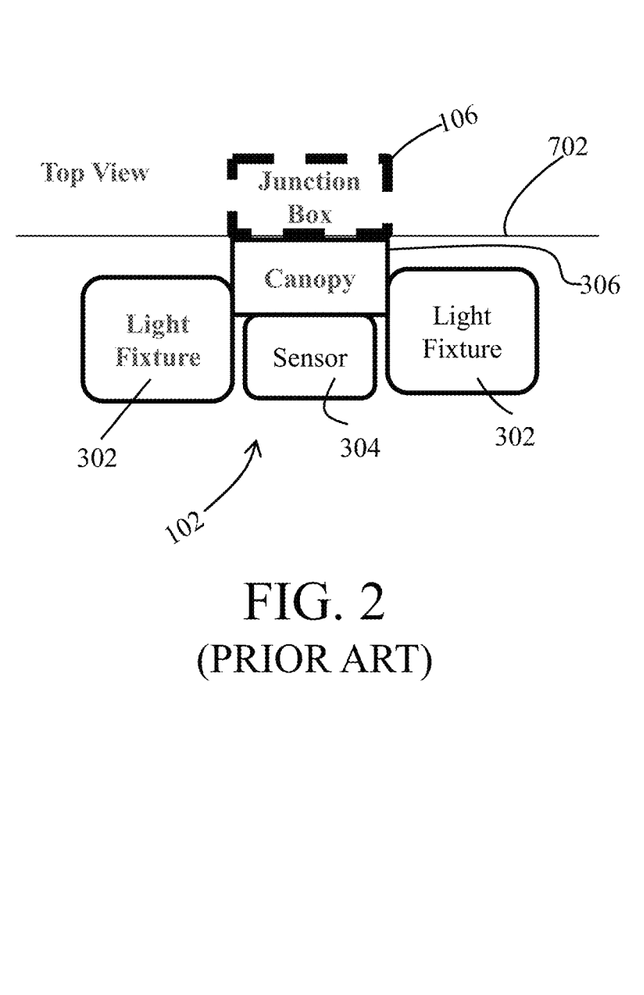
FIG. 2 illustrates a side view of an installation of the conventional lighting system of FIG. 1 where the conventional lighting system is mounted on a junction box, in accordance with a prior art lighting system.

Lighting systems 102, such as motion activated floodlights or other outdoor security light fixtures are required to be mounted over a junction box 106 as illustrated in FIG. 2 to be code compliant, i.e., to meet the National Electric Code (NEC) for safe installation of electrical wiring and equipment. Often the lighting systems 102 are installed in inconvenient locations, such as under the eaves 104, corners, or similar structures of a building 105 as illustrated in FIG. 1. Due to installation complexity, lack of easy access, and/or lack of readily available support structures, frequently, the junction boxes 106 are not installed in said inconvenient locations. So, typically the lighting systems 102 installed in such inconvenient locations are directly connected to electrical wiring cables carrying high voltage electrical wiring, e.g., Romex cables that are routed from a junction box 106 that is installed up stream or remote from such inconvenient locations, resulting in an installation that is not code compliant.

Retrofitting or upgrading such lighting systems 102 that are not installed according to code is cost-intensive, time-intensive, and labor-intensive as it requires a professional electrician to be hired to bring the installations up to code by attaching a junction box 106 at the required location, running the electrical wires to the lighting systems 102 through the junction box 106, and mounting the lighting systems 102 to the junction box 106. Further, even if the lighting systems 102 are installed according to code, retrofitting or upgrading the lighting systems 102 may require hiring a professional electrician because it may require interaction with high voltage electrical wiring that is used to attach the lighting systems 102 and/or accessories to a main power supply. In other words, existing installation solutions for lighting systems 102 do not provide flexibility for the end user to upgrade or retrofit the lighting systems 102 themselves, i.e., without having to hire a professional electrician.

Figure 3:
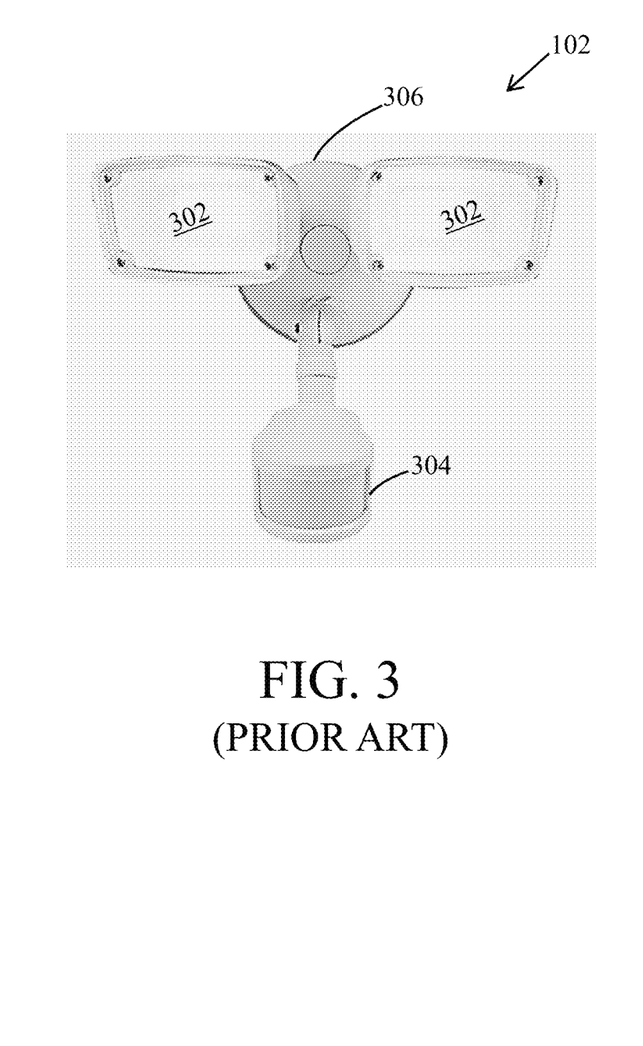
FIG. 3 illustrates a perspective view of the conventional lighting system of FIG. 1, in accordance with a prior art lighting system.

Furthermore, the different components or accessories of the existing lighting systems 102, such as light fixtures 302, sensors 304, etc., of an outdoor security lighting system, are clustered together around a canopy 306 that is mounted to the junction box 106, as illustrated in FIGS. 2 and 3. Additionally, existing lighting systems 102 do not allow low voltage accessories, such as a camera, speakers, Internet of Things (IoT) devices, etc., to be easily added or coupled to the lighting systems 102. In other words, existing line voltage lighting systems 102 are not modular.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure is related to a system that includes a home base unit that comprises a housing that defines a cavity. The housing is water proof. Further, the system includes circuitry that is disposed in the cavity defined by the housing of the home base unit. The circuitry is configured to convert a high voltage AC input power to a low voltage DC output power. Furthermore, the system includes an output port formed in the housing of the home base unit and configured to provide the low voltage DC output power via a low voltage cable to at least one of a light fixture and an accessory.

In another aspect, the present disclosure is related to a home base unit. The home base unit includes a front cover. The front cover includes a front wall, a sidewall that is substantially perpendicular to the front wall and extends along a perimeter of the front wall, and at least one knockout that is formed on the sidewall. Further, the home base unit includes a back cover that comprises a plurality of mounting apertures. Furthermore, the home base unit includes a base member that is coupled to the back cover on one side and the front cover on an opposite side such that the base member is disposed in between the front cover and the back cover. The base member includes a cavity, circuitry that is disposed in the cavity and configured to convert a high voltage AC input power to a low voltage DC output power, and an output port formed therein and configured to provide the low voltage DC output power via a low voltage cable to at least one of a light fixture and an accessory.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawing, wherein.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a modular lighting installation platform. The modular lighting installation platform includes a home base unit that operates as a remote power supply unit. The home base unit can be used as a junction box, thereby eliminating the need to mount lighting systems (e.g., outdoor security lighting systems) to a junction box and enabling the lighting systems to be mounted anywhere while still being code compliant. The home base unit allows accessories to be coupled to the existing lighting systems via low voltage wiring, thereby allowing existing lighting systems to be easily scaled, expanded, upgraded, or retrofitted. The low voltage wiring allows the end user to retrofit or upgrade the lighting systems themselves, i.e., without having to hire a professional electrician.

In the following paragraphs, a modular lighting installation platform will be described in further detail by way of examples with reference to the attached drawings. In particular, example embodiments of the modular lighting installation platform of the present disclosure will be described in association with FIGS. 4-9 and an example home base unit of the modular lighting installation platform will be described in association with FIGS. 10-13. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Referring to FIGS. 4 and 10-13, an example modular lighting installation platform 400 may include a home base unit 402 that may be configured to step down and convert high voltage AC input power to low voltage DC output power. For example, the home base unit 402 may be configured to step down and convert 120-277V AC input power up to 45V DC output power. The home base unit 402 may include circuitry 421, such as a switched mode power supply (SMPS) circuit, a combination of an AC-DC converter circuit and a step-down transformer circuit, or a driver 1204 that is configured to step down and convert the high voltage AC input power to low voltage DC output power. The circuitry 421 associated with the home base unit 402 may be disposed in a housing 1002 of the home base unit 402 that defines an enclosed cavity to house the circuitry 421.

As illustrated in FIGS. 10-13, the housing 1002 of an example home base unit 402 may include a front cover 1004 and a back cover 1006. Further, the example home base unit 402 may include a base member 1201. In the example embodiment illustrated in FIGS. 10-13, the housing 1002 may be assembled by coupling both the back cover 1006 and the front cover 1004 to the base member 1201 such that: (a) the base member 1201 is disposed in a cavity 1221 defined by the front cover 1004, and (b) the base member 1201 is disposed between the front cover 1004 and the back cover 1006.

The back cover 1006 may include coupling holes 1213 that are disposed adjacent the corners of the back cover 1006. The coupling holes 1213 may be configured to receive fasteners 1102 therethrough to couple the back cover 1006 to the base member 1201. In addition to the coupling holes 1213, the back cover 1006 may include a central opening 1210 and a plurality of mounting apertures 1211 that are disposed around the central opening 1210.

Figure 12:
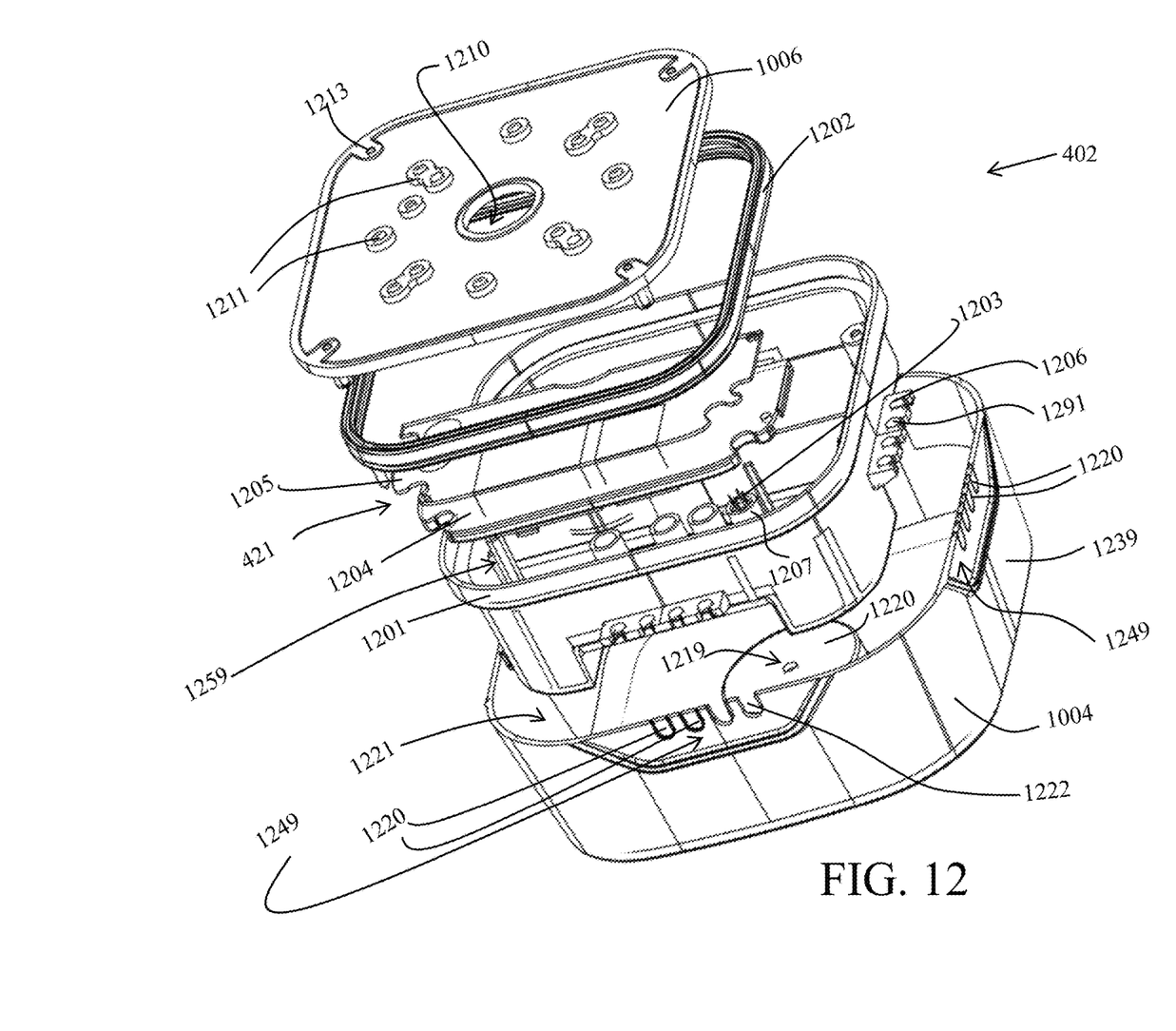
Figure 13:
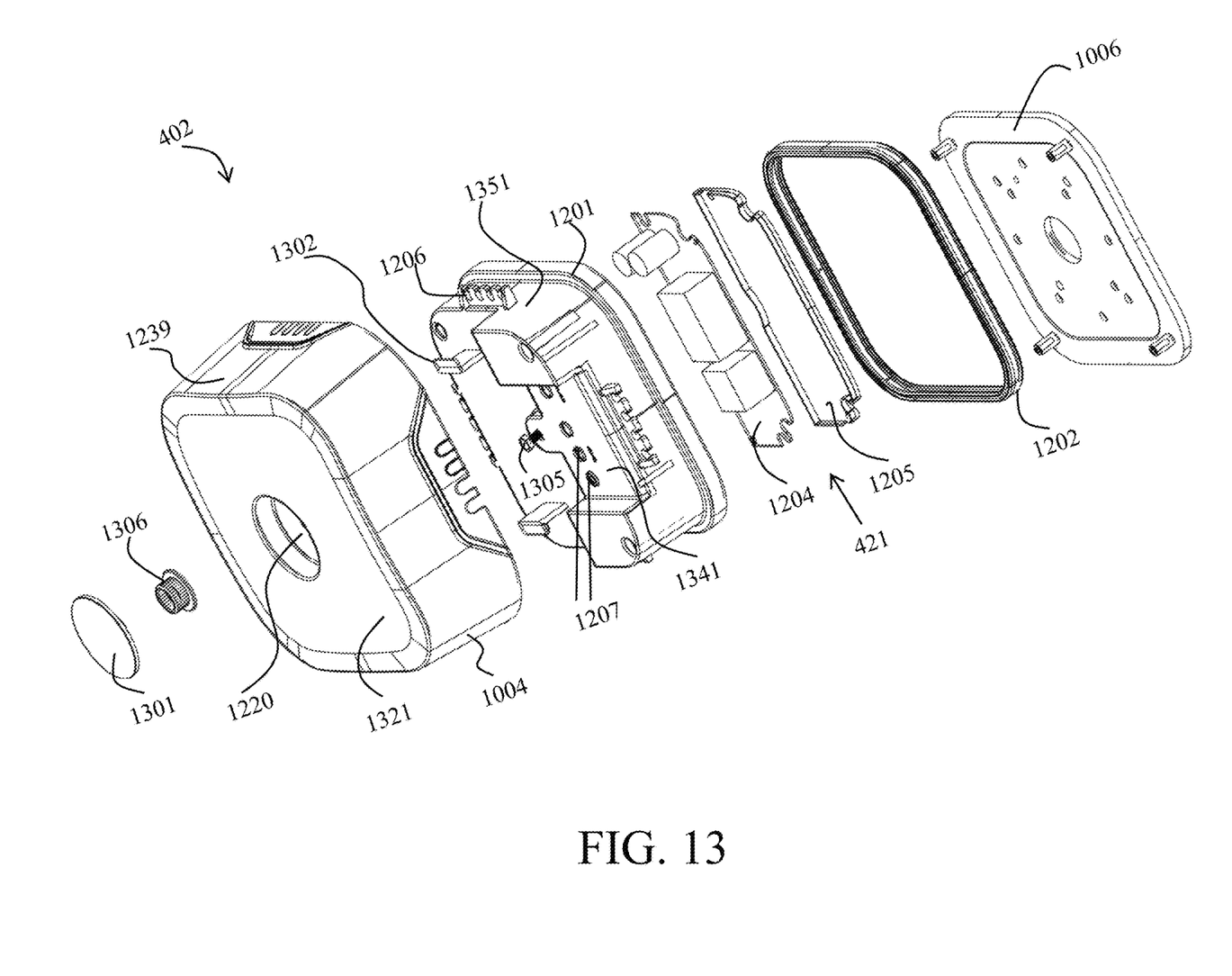

The front cover 1004 may include a front wall 1321 and a sidewall 1239 that extends along a perimeter of the front wall 1321 and substantially perpendicular to the front wall 1321. The front wall 1321 may include a central recessed portion 1220 that comprises a securement aperture 1219 that is formed therein. The securement aperture 1219 may be configured to receive a screw and nut assembly (1305, 1306) from the base member 1201 therethrough to couple the front cover 1004 to the base member 1201. The recessed portion 1220 and the portion of the screw and nut assembly (1305, 1306) that extends through the recessed portion 1220 may be concealed by a decorative cover 1301. Further, the sidewall 1239 may include a plurality of knockouts 1220 that are formed therein. The plurality of knockouts 1220 may include multiple sets of knockouts 1249, where each set of knockouts 1249 is disposed on a respective side of the home base unit 402 such that knockouts 1220 are provided on more than one side of the home base unit 402. Providing knockouts 1220 on more than one side of the home base unit 402 allows low voltage output cables 405 from one or more devices (e.g., light fixtures 406 or accessories 410 which will be described below in greater detail) to be routed to the home base unit 402 from more than one side of the home base unit, thereby improving installation flexibility. As illustrated in FIG. 12, the knockouts 1220 may be detached from the sidewall 1239 of the front cover 1004 to define notches 1222 that provide a path for routing the low voltage output cables 405 to the different output cable connecting ports 1207 of the home base unit 402.

As illustrated in FIGS. 12 and 13, the base member 1201 may define a port wall 1341 and a sidewall 1351 that extends along a perimeter of the port wall 1341. The port wall 1341 and the sidewall 1351 may be arranged such that they define an electronics cavity 1259 that is configured to receive the circuitry 421 therein. The home base unit 402 may include a cavity cover 1205 that is configured to enclose the electronics cavity 1259 with the circuitry 421 disposed therein. The base member 1201 may further include output cable connecting ports 1207 that are defined by bosses that extend into the electronics cavity 1259 and receptacles 1203 that are disposed therein. As illustrated in FIG. 13, the port wall 1341 may include openings that are aligned with the receptacles 1203 to receive a connector of the low voltage output cable 405 therein.

Even though the present disclosure describes the circuitry of the home base unit 402 as including an SMPS circuit or a combination of the AC-DC converter circuit and a step-down transformer circuit, one of skill in the art can understand and appreciate that the home base unit 402 may have any other appropriate hardware circuits or software modules without departing from a broader scope of the present disclosure. For example, the home base unit 402 may include a controller (e.g., micro-controller) with software stored therein. The controller may be configured to control and/or coordinate one or more functions or operations of the devices connected to the home base unit 402, such as light fixtures 406 and/or accessories 410, individually or in combination such that devices either operate independently or in concert. Furthermore, in some examples, the home base unit 402 may include a communication module (wired or wireless) that is configured to relay data (e.g., sensor data, control data, etc.) between the devices (406, 410) that are coupled to the home base unit 402 and a control system (e.g., master security controller, building lighting control system, etc.) and/or another home base unit 402. That is, in addition to operating as a code compliant junction box and converting high voltage AC input power to low voltage DC output power, in one or more example embodiments, the home base unit 402 may have circuitry and/or software modules that provide additional functionality to the home base unit 402. Such additional functionality may include, but is not limited to, processing data received from the light fixtures 406 and accessories 410 coupled thereto, processing data received from other home base units 402, transmitting data (e.g., control data, data from accessories and light fixtures, etc.) to another location (e.g., a central controller, another home base unit 402, etc.), making control decisions to coordinate and control the operations of the light fixtures 406 and accessories 410 coupled thereto based on the data received from the light fixtures 406 and accessories 410 coupled thereto, control signals received from external controllers (e.g., lighting control systems, home security controller, remote security station, etc.), data received from other home base units, etc.

In some example embodiments, different home base units 402 installed in a building or within a certain area may be configured to operate in concert as a network, i.e., coordinate with each other, to control the light fixtures 406 and/or accessories 410 coupled to one or more of the home base units 402 in the network.

In certain example embodiments, the housing 1002 of the home base unit 402 may be designed with features that are substantially similar to that of a code compliant junction box which allows the home base unit 402 to be used as a legal code compliant junction box. For example, the housing 1002 of the home base unit 402 may be configured to be a fire rated box. That is, the design of the housing 1002 may be compliant with NEC fire rating standards. Further, the housing 1002 of the home base unit 402 may be water proof and rated for the outdoor installations, e.g., UL wet location rating. Even though the present disclosure describes the housing as being fire rated and UL wet location rated, one of skill in the art can understand and appreciate that in other example embodiments, the housing 1002 may be compliant with other ratings as well without departing from a broader scope of the present disclosure. For example, in some examples, the housing 1002 of the home base unit 402 may be designed to be compliant with IP ingress protection and wildlife ingress protection. For example, as illustrated in FIGS. 12 and 13, a gasket 1202 may be disposed between the back cover 1006 and the base member 1201 to create a waterproof seal and ingress barrier therebetween.

Figure 10:
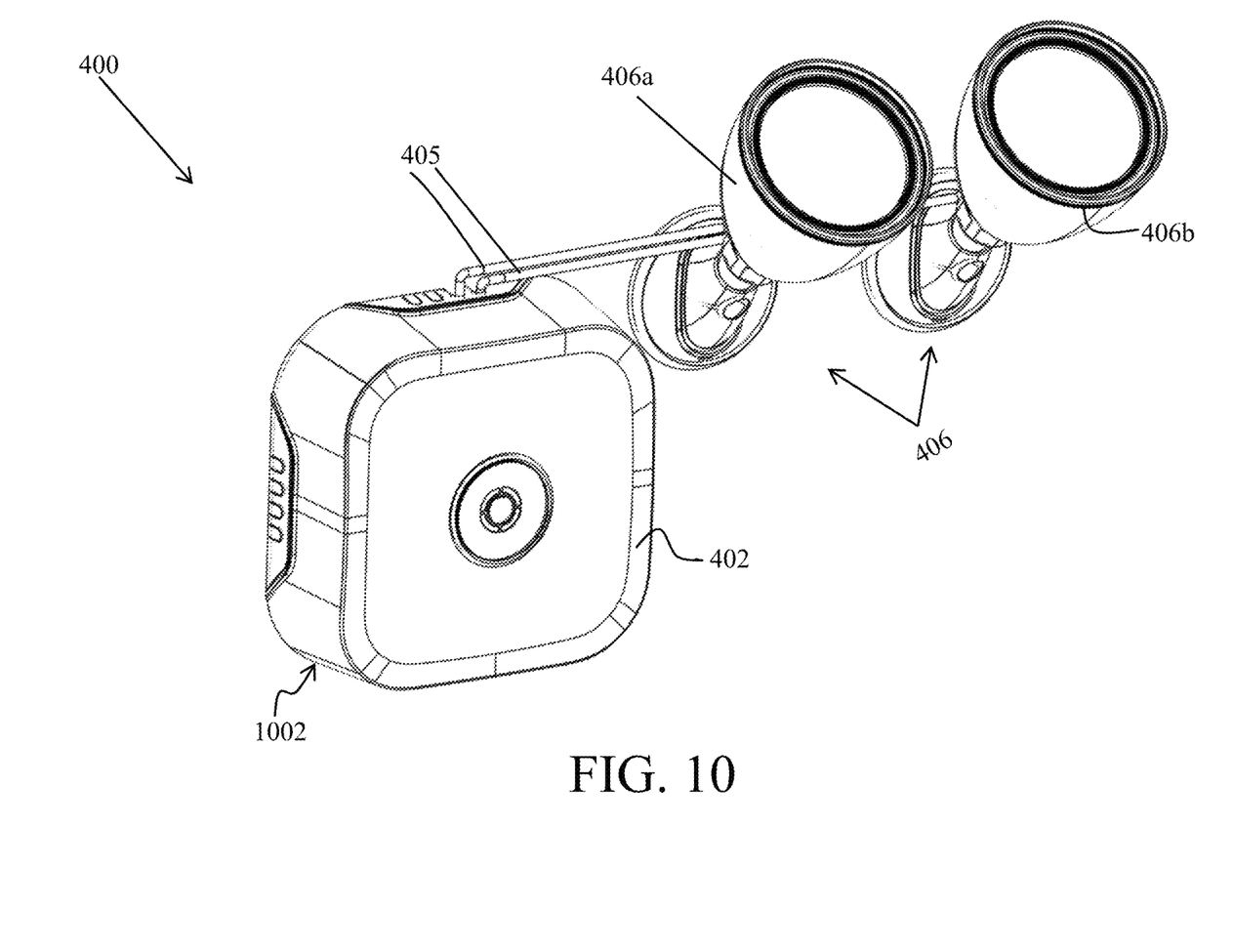
FIG. 10 illustrates an example home base unit of the modular lighting installation platform with example lighting systems coupled thereto, in accordance with example embodiments of the present disclosure.
Figure 11:
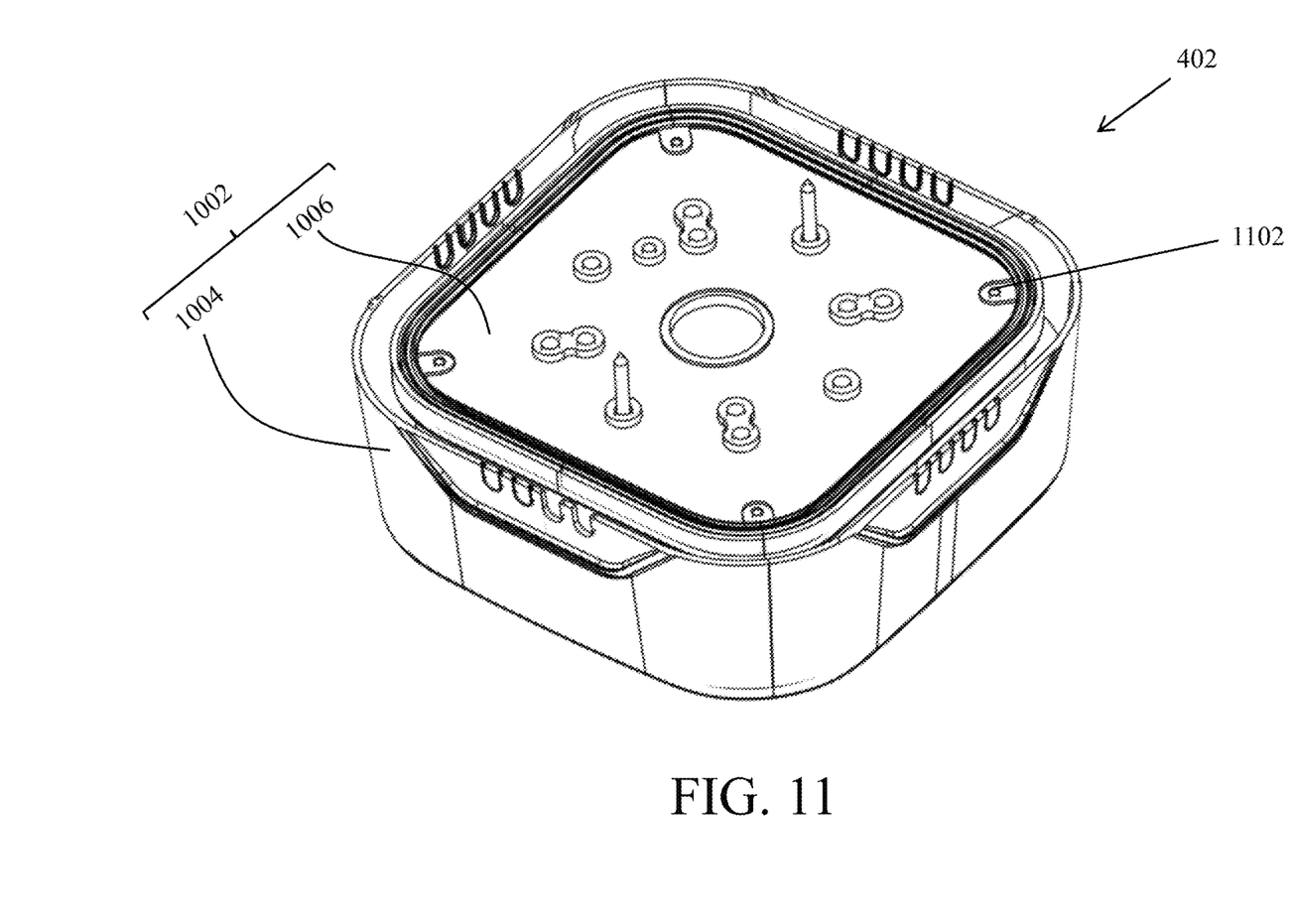
FIGS. 11-13 illustrate a perspective view and various exploded views of the example home base unit, in accordance with example embodiments of the present disclosure.

In certain example embodiments, the central opening 1210 formed in the back cover 1006 of the housing 1002 of the home base unit 402 may be configured to route an input electrical wiring cable 401, i.e., the wire carrying the high voltage input AC power (e.g., Romex cable) from a main power supply 404 to the circuitry 421 (e.g., SMPS, AC-DC converter, step down transformer, etc.) disposed in the home base unit 402. The central opening 1210 may be sealed to create a waterproof seal around the input electrical wiring cable 401 and such that the fire rating of the housing is maintained. Further, as described above, the base member 1201 of the home base unit 402 may include output cable connecting ports 1207 to which low voltage output cables 405 may be connected. The output cable connecting ports 1207 are formed in the port wall 1341 to allow the output low voltage cables 405 that enter the home base unit 402 from any side thereof to be coupled thereto, which in turn provides increased installation flexibility. As illustrated in FIG. 10, the output low voltage cables 405 may be routed to the output cable connecting ports 1207 via the notches 1222 that are formed in the sidewall 1239 of the front cover 1004 and the wire holder tabs 1291 of the wire management member 1206 that extend from a sidewall 1351 of the base member 1201. The port wall 1341 may also include wire wrapping tabs 1302 to wrap longer cables thereon as part of the wire management feature of the home base unit 402.

In some example embodiments, the housing 1002 of the home base unit 402 may further include a door (not illustrated) to the output cable connecting ports 1207. In said example embodiment, the door may be opened to expose the output cable connecting ports for connecting low voltage output cables 405 thereto. The door may be designed such that once the low voltage output cables 405 are connected to the respective output cable connecting ports and the door is closed, a waterproof seal may be created around the output low voltage cables 405.

In one example embodiment, the home base unit 402 may include three or four output cable connecting ports 1207. However, in other example embodiments, the home base unit 402 may include fewer (e.g., at least one) or more output cable connecting ports 1207. The low voltage cables 405 that are used to couple the light fixtures 406 and/or accessories 410 to the home base unit 402 may be configured to: (i) supply power to the light fixtures 406 and/or accessories 410, and (ii) allow data communication between the home base unit 402 and the light fixtures 406 and/or accessories 410. For example, a home base unit 402 may be coupled to a motion sensor (e.g., accessory 410) and a light fixture (406a) via a first low voltage cable and a second low voltage cable, respectively. In said example, the home base unit 402 may supply power to the motion sensor and the light fixture 406a via the respective first and second low voltage cables 405. Further, in said example, data from the motion sensor may be transmitted to the home base unit 402 via the first low voltage cable. The data may be processed by the home base unit 402 and/or may be transmitted to another home base unit or a central control system (not illustrated) by the home base unit 402. In said example, based on the data that is received from the motion sensor and/or control data received from other home base units or the central control system, the home base unit 402 may operate a relay (not illustrated) to control the light fixture 406a (e.g., switch on, switch off, dim, change color, etc.) that is coupled to the home base unit 402 via the second low voltage cable.

One of skill in the art can understand and appreciate that the low voltage output cables 405 can include any appropriate low voltage cables that can provide both power and data. The output cable connecting ports 1207 of the home base unit 402 may be designed to be compatible with the type of cable connectors/terminations of the low voltage output cables 405. The cable connectors/terminations of the low voltage output cables may include, but are not limited to, RJ-45, USB (for USB cables), barrel connectors, etc.

Figure 6:
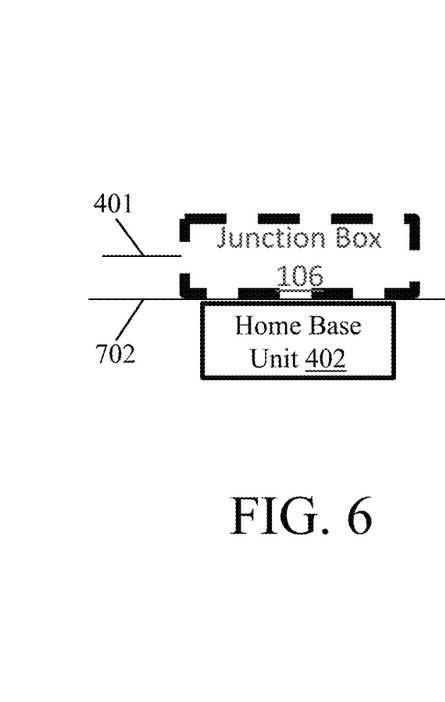
FIGS. 6-8 illustrate different wiring solutions for the home base unit of the modular lighting installation platform of FIGS. 4 and 5, in accordance with example embodiments of the present disclosure.
Figure 7:
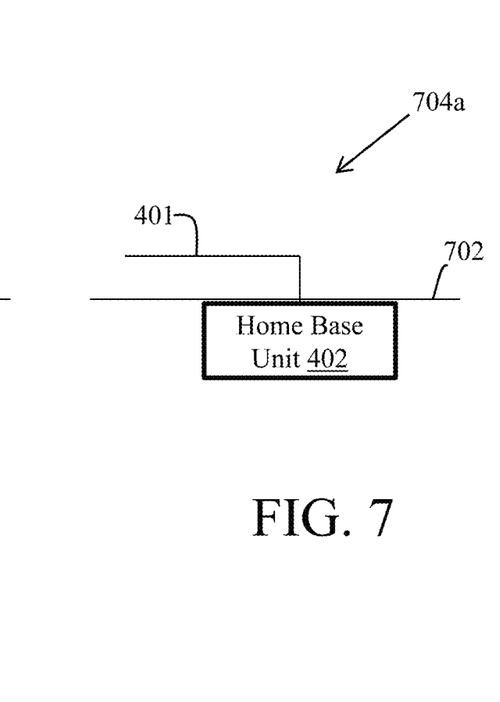
Figure 8:
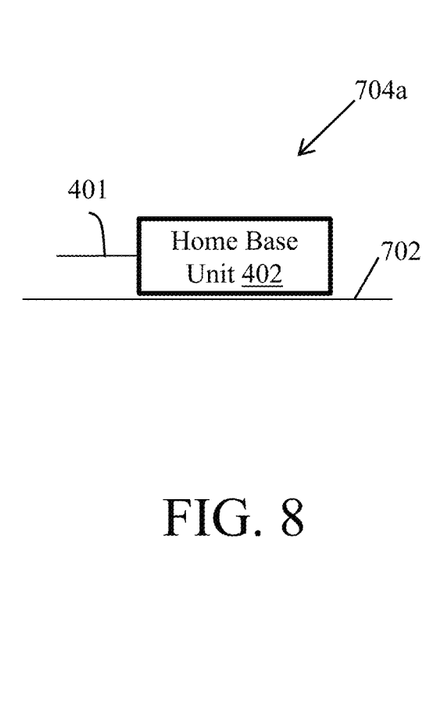
Figure 9:
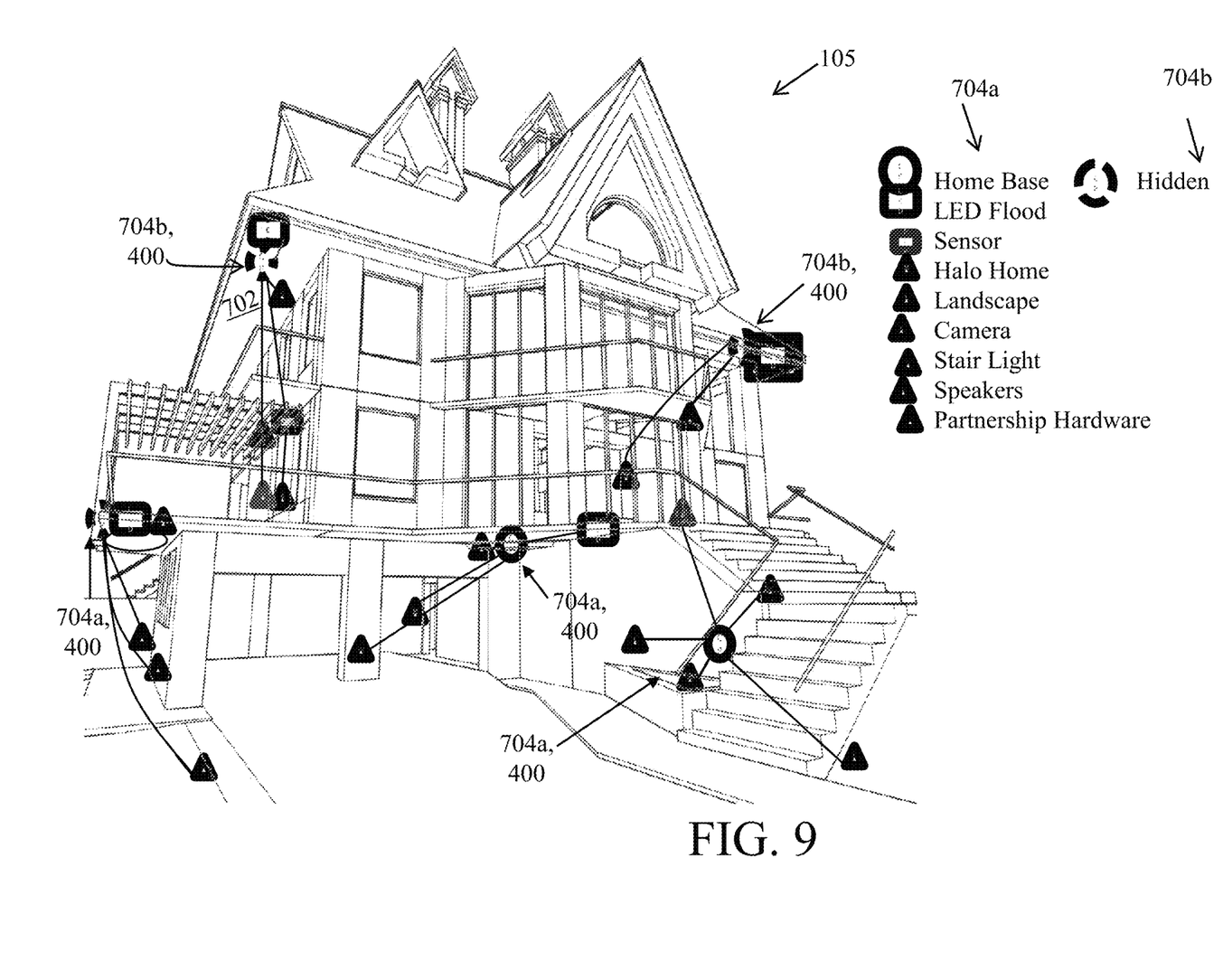
FIG. 9 illustrates lighting systems of the modular lighting installation platform installed in the example building, in accordance with example embodiments of the present disclosure.

The plurality of mounting apertures 1211 that are formed in the back cover 1006 of the home base unit 402 are configured to allow different mounting options for the home base unit 402 which in turn allows the different wiring solutions. For example, as illustrated in FIG. 6, the home base unit 402 may be wired to or mounted on a traditional junction box 106 as in existing lighting systems 102. Once the home base unit 402 is wired to or mounted on the traditional junction box 106, an end user can freely wire any appropriate light fixture 406 and/or accessory 410 from the home base unit 402 to their desired location per code via low voltage cables 405. In other examples, as illustrated in FIGS. 7 and 8, if there is no junction box 106 present, the end user can have the home base unit 402 act as a legal code compliant junction box which can be wired to a main power supply 404 via electrical wiring cable 401. Then, the end user can themselves wire any appropriate light fixture 406 and/or accessory 410 from the home base unit to the desired location via low voltage cable 405. Furthermore, depending on the end users preference, in some example embodiment, the home base unit 402 may be installed below the soffit 702 such that it is externally visible (e.g., visible installation 704a) as illustrated in FIGS. 7 and 9, while in other example embodiments, the home base unit 402 may be installed behind the soffit 702 such that it is concealed or hidden from view (e.g., hidden installation 704b) as illustrated in FIGS. 8 and 9.

Converting the high voltage input AC power (e.g., 120V AC) to low voltage DC output power at the home base unit 402 allows devices that operate on DC power such as cameras, sensors, etc., to be coupled to the home base unit 402. Further, converting the high voltage input AC power (e.g., 120V AC) to low voltage DC output power at the home base unit 402 allows the size of the light fixtures 406 and/or accessories 410 that are coupled to the home base unit 402 to be reduced and made compact. Typically, the circuitry for converting the high voltage AC input power to low voltage DC output power is disposed in the housing of light fixtures and/or accessories which in turn makes the light fixtures and/or accessories bulky. In the modular lighting installation platform 400 disclosed herein, circuitry that is associated with converting the high voltage AC input power to a compatible low voltage DC output power is moved to the home base unit 402, thereby eliminating the need to include such circuitry (e.g., drivers, AC-DC converters, step-down devices, etc.) in the light fixture and/or accessories, thereby enabling the light fixtures 406 and/or accessories 410 coupled to the home base unit 402 to be compact in size.

Furthermore, converting the high voltage input AC power to low voltage DC output power at the home base unit 402 allows end users to connect the light fixtures 406 and/or the accessories 410 to the home base unit 402 without having to hire an electrician because the light fixtures 406 and/or the accessories 410 can be connected to the home base unit 402 using low voltage cables that may not pose the risk of fire hazard, shock, etc. Additionally, the ability to connect the light fixtures 406 and/or the accessories 410 to the home base unit 402 using low voltage output cables 405 provides a plug and play solution and allows the light fixtures 406 and/or the accessories 410 to be installed remote from the home base unit 402 at a location desired by the end user (restricted by the length of the low voltage cable). That is, the light fixtures 406 and/or the accessories 410 do not have to be clustered together in one location as in the case of conventional lighting system 102 as illustrated in FIG. 3.

Figure 4:
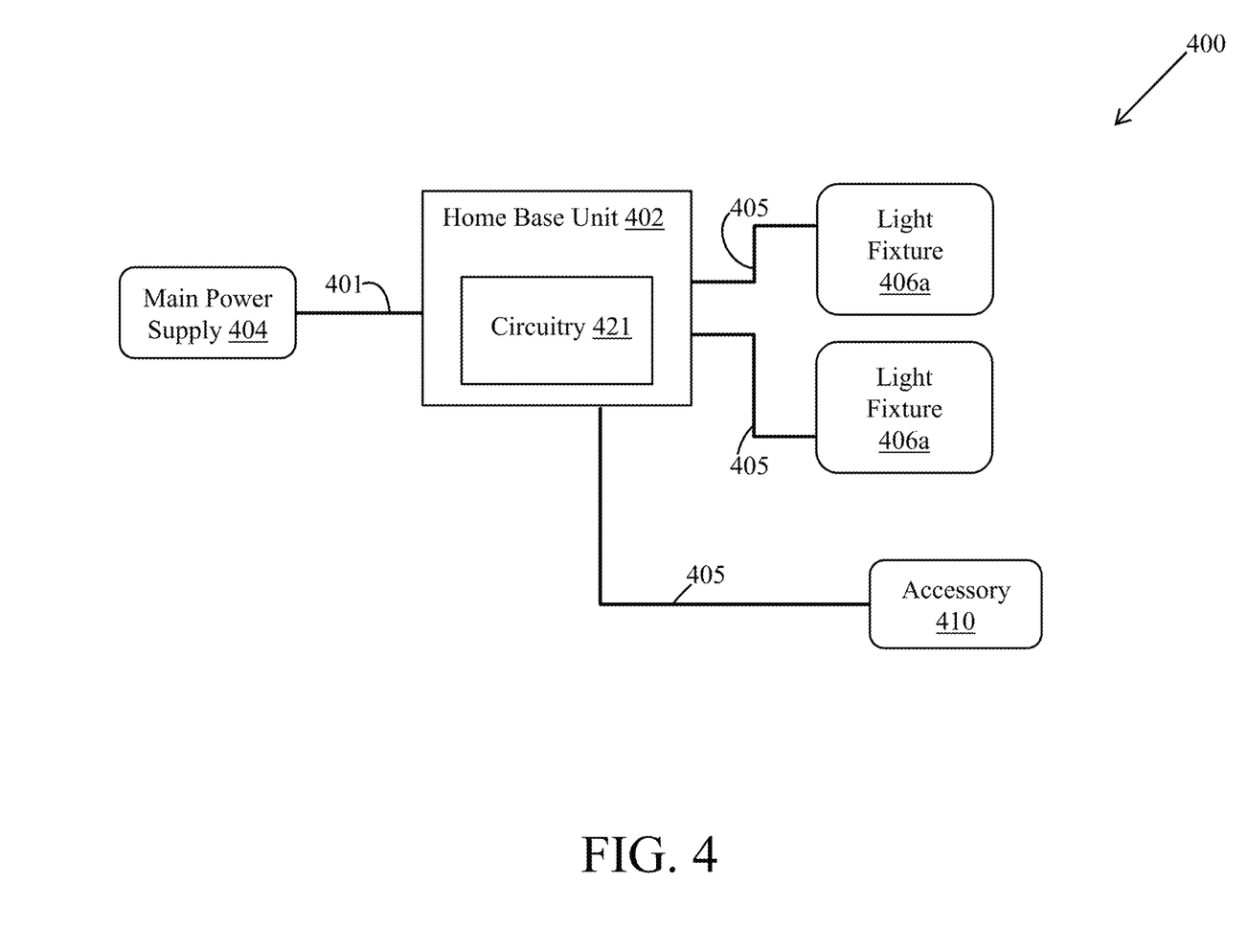
FIG. 4 illustrates a schematic view of a modular lighting installation platform, in accordance with example embodiments of the present disclosure.
Figure 5:
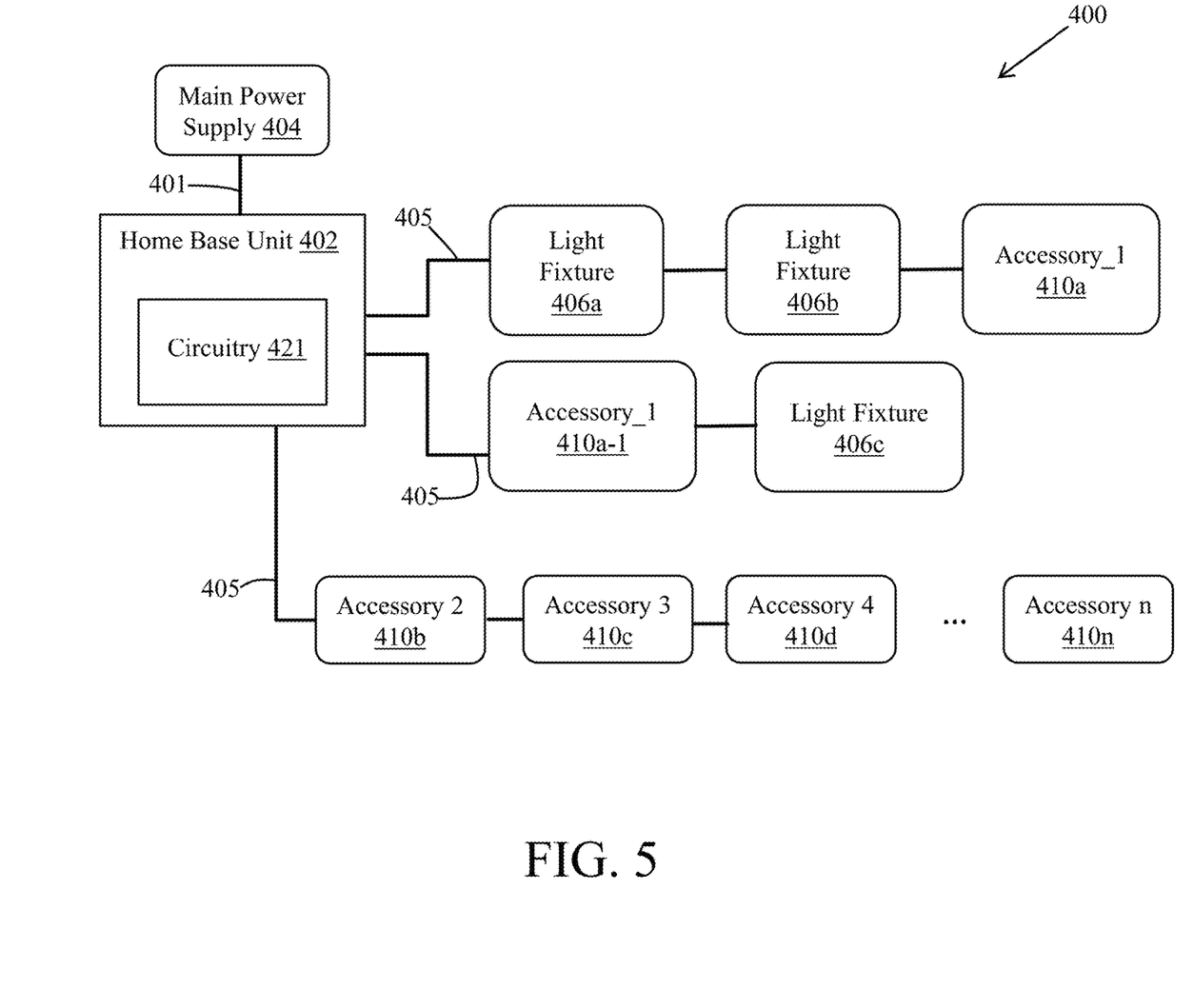
FIG. 5 illustrates a schematic view of a modular lighting installation platform with lighting systems and/or accessories daisy chained to the home base unit of the modular lighting installation platform, in accordance with example embodiments of the present disclosure.

As described above and as illustrated in FIG. 4, the home base unit 402 of the example modular lighting installation platform 400 may be configured to allow light fixture 406 and/or accessories 410 to be coupled thereto via the low voltage cables 405. In one example embodiment, as illustrated in FIGS. 4 and 9, only one light fixture 406 or accessory 410 may be connected per output cable connecting port of the home base unit 402 via a low voltage cable 405. That is, each output cable connecting port of the home base unit 402 may be configured to support only one light fixture 406 and/or accessory 410 per output cable connecting port. However, in other example embodiments, more than one light fixture (406a-406c) and/or accessory (410a-1, 410a-2, 410b-410n) may be connected per output cable connecting port of the home base unit 402 as illustrated in FIG. 5. That is, multiple light fixtures (406a-406c) and/or accessories (410a-1, 410a-2, 410b-410n) of the same type or different types may be daisy chained to each output cable connecting port of the home base unit 402. The ability to couple one or more light fixtures and/or accessories to the home base unit allows a user to upgrade, retrofit, or adjust a lighting system as desired by the user based on a look or functionality desired by the user. For example, one bright light fixture may be coupled to the home base unit 402 or multiple light fixtures, e.g., smaller luminaires of lower output may be coupled to the home base unit 402 instead of one bright fixture to create a different look, as desired by the user.

The optimal number of light fixtures 406 or accessories 410 that may be connected per output cable connecting port of the home base unit 402 may be a range rather than a specific number of light fixtures 406 and/or the accessories 410. Alternatively, the optimal number of light fixtures 406 or accessories 410 that may be connected per output cable connecting port of the home base unit 402 may be based on a range of the total amount of power that will be drawn by the light fixtures 406 and/or the accessories 410, when in use. For example, the total wattage drawn by the accessories 410 and/or light fixtures 406 coupled to the home base unit 402 may not exceed 100 W and the output voltage may not exceed 45V to maintain a Class 2 standard.

The light fixtures 406 and/or accessories 410 may include any appropriate light fixtures and digital or analog devices without departing from a broader scope of the present disclosure. For example, the accessories 410 may include, but are not limited to, cameras, speakers, smart speakers (Amazon Echo, Google Assistant, etc.), WiFi repeaters, network devices, alarms, sensors (e.g., motion sensors, gunshot detection sensors, and so on), home automation systems (e.g., Halo home), etc. Similarly, the light fixtures 406 may include, but are not limited to, floodlights, landscape light fixtures, accent wall and stairs light fixtures, etc.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system comprising:
    a home base unit that comprises a housing that defines a cavity;
    circuitry that is disposed in the cavity defined by the housing of the home base unit and configured to convert a high voltage AC input power to a low voltage DC output power; and
    an output port formed in the housing of the home base unit and configured to provide the low voltage DC output power via a low voltage cable to at least one of a light fixture and an accessory,
    wherein when a junction box is absent, the home base unit is configured to act as a code compliant junction box, and wherein the home base unit is configured to be coupled to a main power supply via an electrical wiring cable from the main power supply.

2. The system of claim 1, wherein more than one light fixture or accessory are daisy chained to the output port of the home base unit.

3. The system of claim 1, wherein the home base unit includes more than one output port formed therein.

4. The system of claim 1, wherein the circuitry comprises a switched mode power supply.

5. The system of claim 1, wherein the home base unit is configured to be mounted on a junction box.

6. The system of claim 1, wherein the housing of the home base unit is fire rated.

7. The system of claim 1, wherein the home base unit is configured to be mounted to a soffit.

8. A system comprising:
    a home base unit that comprises a housing having a base member, a front cover, and a back cover, the base member defining a cavity;
    circuitry that is disposed in the cavity defined by the base member of the housing and configured to convert a high voltage AC input power to a low voltage DC output power; and
    an output port formed in the housing of the home base unit and configured to provide the low voltage DC output power via a low voltage cable to at least one of a light fixture and an accessory;
    wherein the front cover is coupled to one side of the base member; and
    wherein the back cover is coupled to an opposite side of the base member and comprises a plurality of mounting apertures that provide different mounting options.

9. The system of claim 8, wherein the base member comprises wire management features that are configured to route the low voltage cable from the at least one of the light fixture and the accessory to the output port.

10. The system of claim 8, wherein the front cover comprises at least one knockout, and wherein the knockout is detachable to form a notch to route the low voltage cable therethrough.

11. The system of claim 8, wherein the base member is disposed between the front cover and the back cover.

12. A home base unit comprising:
    a front cover comprising:
        a front wall;
        a sidewall that is substantially perpendicular to the front wall and that extends along a perimeter of the front wall; and
        at least one knockout that is formed in the sidewall;
    a back cover comprising a plurality of mounting apertures; and
    a base member that is coupled to the back cover on one side and the front cover on an opposite side such that the base member is disposed in between the front cover and the back cover, the base member comprising:
        a cavity;
        circuitry that is disposed in the cavity and configured to convert a high voltage AC input power to a low voltage DC output power; and
        an output port formed therein and configured to provide the low voltage DC output power via a low voltage cable to at least one of a light fixture and an accessory.

13. The home base unit of claim 12, wherein the wire management features that are configured to manage routing of the low voltage cable from the at least one of the light fixture and the accessory to the output port.

14. The home base unit of claim 12, wherein more than one light fixture or accessory is daisy chained to the output port of the home base unit.

15. The home base unit of claim 12, wherein the home base unit includes more than one output port formed therein.

16. The home base unit of claim 12, wherein the circuitry comprises a switched mode power supply.

17. The home base unit of claim 12, wherein the home base unit is configured to be mounted on a junction box via at least one of the plurality of mounting apertures.

18. The home base unit of claim 12, wherein the home base unit is configured to be mounted to a soffit via at least one of the plurality of mounting apertures.

19. The home base unit of claim 12, wherein the home base unit is fire rated and waterproof.

20. The home base unit of claim 12, wherein when a junction box is absent, the home base unit is configured to act as a code compliant junction box, and wherein the home base unit is configured to be coupled to a main power supply via an electrical wiring cable from the main power supply.

* * * * *